US011539286B2

(12) United States Patent
Hsu et al.

(10) Patent No.: US 11,539,286 B2
(45) Date of Patent: Dec. 27, 2022

(54) CLAMPING CIRCUIT

(71) Applicant: Quanta Computer Inc., Taoyuan (TW)

(72) Inventors: Kuo-Chan Hsu, Taoyuan (TW);
Yun-Teng Shih, Taoyuan (TW);
Shou-Fu Li, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/236,630

(22) Filed: Apr. 21, 2021

(65) Prior Publication Data

US 2022/0345028 A1      Oct. 27, 2022

(51) Int. Cl.
*H02M 1/32* (2007.01)
*H02M 1/36* (2007.01)

(52) U.S. Cl.
CPC ............... *H02M 1/32* (2013.01); *H02M 1/36* (2013.01)

(58) Field of Classification Search
CPC .................................. H02M 1/32; H02M 1/36
See application file for complete search history.

(56) References Cited

U.S. PATENT DOCUMENTS

| 2010/0039836 | A1* | 2/2010 | Gong ................... H02M 3/156 363/21.13 |
| 2017/0366102 | A1* | 12/2017 | Kikuchi ............ H02M 3/33523 |
| 2018/0034310 | A1 | 2/2018 | Zhang et al. |

FOREIGN PATENT DOCUMENTS

| CN | 101562393 A | * 10/2009 |
| TW | 200832872 A | 8/2008 |
| TW | 202017288 A | 5/2020 |

OTHER PUBLICATIONS

TW Office Action for Application No. 110124883, dated Aug. 22, 2022, w/ First Office Action Summary.
TW Search Report for Application No. 110124883, dated Aug. 22, 2022, w/ First Office Action.

* cited by examiner

*Primary Examiner* — Jue Zhang
(74) *Attorney, Agent, or Firm* — Nixon Peabody LLP (57) ABSTRACT

A power supply circuit includes a power converter, an input voltage source, and a clamping circuit. The power converter has an input pin, an output pin, and an enable pin. The input voltage source is electrically connected to the input pin, and provides an input voltage to the input pin. The clamping circuit is electrically connected to the enable pin of the power converter. When the input voltage increases to at least a threshold input voltage, the clamping circuit is configured to activate the power converter to provide an output voltage at the output pin. When the input voltage decreases below the threshold input voltage, the clamping circuit is configured to deactivate the power converter and prevent the power converter from being re-activated within a predefined time period.

15 Claims, 4 Drawing Sheets

CLAMPING CIRCUIT

FIELD OF THE INVENTION

The present invention relates generally to power supply circuits, and more specifically, to a power supply circuit having a clamping circuit to prevent output voltage spikes.

BACKGROUND OF THE INVENTION

Computing systems and devices include a variety of electronic components that are powered by a power supply unit. The power supply unit can receive an input voltage and produce an output voltage that is usable by the electronic components of the computing system. The power supply unit can include protection against an undervoltage condition, which occurs when the voltage provided to the electronic components is lower than intended. To prevent an undervoltage condition, the power supply can include a device or component that deactivates the output voltage produced for these electronic components when the input voltage decreases below a threshold. During a standard power-down sequence when the input voltage decreases below the threshold, a ripple component of the input voltage can momentarily reactivate the output voltage, which can cause damage to the electronic components. Accordingly, an improved power supply unit is needed that can prevent the ripple component from momentarily reactivating the output voltage.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In a first implementation, the present disclosure is directed toward a power supply circuit. The power supply circuit includes a power converter, an input voltage source, and a clamping circuit. The power converter has an input pin, an output pin, and an enable pin. The input voltage source is electrically connected to the input pin of the power converter circuit, and is configured to provide an input voltage. The clamping circuit is electrically connected to the enable pin of the power converter. In response to input voltage increasing to at least a threshold input voltage, the clamping circuit activates the power converter to provide an output voltage at the output pin. In response to the input voltage decreasing below the threshold input voltage, the clamping circuit deactivates the power converter and prevents the power converter from being re-activated within a predefined time period.

In some cases, the input voltage includes a ripple component that causes the input voltage to have a periodic variation with a ripple frequency and a ripple period. In some cases, in response to the input voltage initially decreasing below the threshold input voltage and then increasing to at least the threshold input voltage due to the ripple component, the clamping circuit prevents the power converter from being re-activated. In some cases, the ripple period is less than the predefined time period, such that the ripple component causes the input voltage to increase to at least the threshold input voltage and to subsequently decrease below the threshold input voltage within the predefined time period.

In some cases, the clamping circuit includes a transistor electrically connected to the input voltage source and the enable pin of the power converter. The transistor is configured to transition between an "on" state and an "off" state to activate and deactivate the power converter. In some cases, in response to the input voltage increasing to at least the threshold input voltage, the transistor transitions from the "off" state to the "on" state. In some cases, in response to the input voltage increasing to at least the threshold input voltage and the transistor transitioning to the "on" state, the transistor causes a threshold enable voltage to be provided to the enable pin of the power converter.

In some cases, the threshold enable voltage is less than the threshold input voltage. In some cases, in response to the input voltage decreasing below the threshold input voltage, the transistor transitions from the "on" state to the "off" state, such that a voltage provided to the enable pin of the power converter is less than the threshold enable voltage.

In some cases, the transistor has a switching frequency that defines a time required for the transistor to transition between the "on" state and the "off" state. The switching frequency is less than the ripple frequency of the ripple component of the input voltage. In some cases, in response to the input voltage initially increasing to at least the threshold input voltage, the transistor transitions to the "on" state to activate the power converter. In response to the input voltage subsequently decreasing below the threshold input voltage, the transistor transitions to the "off" state to deactivate the power converter. In some cases, in response to the ripple component of the input voltage causing the input voltage to, within the predefined time period, (i) increase to at least the threshold input voltage and then (ii) decrease below the input voltage, the transistor remains in the "off" state. In some cases, after the ripple component of the input voltage causes the input voltage to increase to at least the threshold input voltage, the ripple component of the input voltage causes the input voltage to then decrease below the threshold input voltage after a first time period. In some cases, in response to the input voltage increasing to at least the threshold input voltage, the transistor is configured to transition to the "on" state only after a second time period has passed. The second time period is greater than the first time period, such that in response to the ripple component of the input voltage causing the input voltage to increase to at least the threshold input voltage, the transistor does not transition to the "on" state before the input voltage decreases below the input voltage.

In some cases, the transistor includes a base, an emitter, and a collector. The base is electrically connected to the input voltage source. The emitter is electrically connected to the input voltage source through an emitter-side resistor. The collector is electrically connected to the enable pin of the power converter. In some cases, when the input voltage is greater than or equal to the threshold input voltage, a voltage provided to the base of the transistor is greater than or equal to a turn-on voltage of the transistor, such that an on-state voltage divider is formed with the emitter-side resistor. The on-state voltage divider provides a voltage to the enable pin of the power converter that is greater than or equal to a threshold enable voltage.

In some cases, when the input voltage source is less than the threshold input voltage, the voltage provided to the base of the transistor is less than the turn-on voltage of the transistor, such that an off-state voltage divider is formed that excludes the emitter-side resistor. The off-state voltage divider provides a voltage to the enable pin of the power converter that is less than the threshold enable voltage. In some cases, the on-state voltage divider includes the emitter-side resistor and an additional resistor electrically connected in parallel between the input voltage source and the enable pin; and the off-state voltage divider includes only the additional resistor electrically connected between the input voltage source and the enable pin.

In a second implementation, the present disclosure is directed toward a power supply circuit. The power supply circuit includes a power converter, an input voltage source, a first resistor, a second resistor, and a clamping circuit. The power converter has an input pin, an output pin, and an enable pin. The input voltage source is configured to provide an input voltage to the input pin of the power converter. The first resistor is electrically connected to the input voltage source and the enable pin of the power converter, such that the input voltage source is electrically connected to the enable pin of the power converter through at least the first resistor. The second resistor is electrically connected to the first resistor and the enable pin of the power converter. The clamping circuit is electrically connected to the enable pin of the power converter. The clamping circuit includes a transistor having a base, an emitter, and a collector. The base is electrically connected to the input voltage source. The collector is electrically connected to the enable pin of the power converter. The clamping circuit further includes an emitter-side resistor that is electrically connected between the emitter and the input voltage source. In response to the input voltage increasing to at least a threshold input voltage, an on-state voltage divider is formed with the first resistor, the second resistor, and the emitter-side resistor to activate the power converter and provide an output voltage at the output pin. In response to the input voltage decreasing below the threshold input voltage, an off-state voltage divider is formed with the first resistor and the second resistor to deactivate the power converter and prevent the power converter from being re-activated within a predefined time period.

In a third implementation, the present disclosure is directed toward a computing system that includes a housing, one or more electronic components disposed within the housing, and a power supply circuit disposed within the housing configured to aid in providing power to the one or more electronic components. The power supply circuit includes a power converter, an input voltage source, and a clamping circuit. The power converter has an input pin, an output pin, and an enable pin. The input voltage source is electrically connected to the input pin of the power converter circuit, and is configured to provide an input voltage. The clamping circuit is electrically connected to the enable pin of the power converter. In response to the input voltage increasing to at least a threshold input voltage, the clamping circuit activates the power converter to provide an output voltage at the output pin. In response to the input voltage decreasing below the threshold input voltage, the clamping circuit deactivates the power converter and prevents the power converter from being re-activated within a predefined time period.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Computing systems and computing devices, such as servers, generally include a variety of different components that are powered using a power supply unit. The power supply unit is configured to convert mains AC power into usable DC power for powering the various components. According to aspects of the present disclosure, the power supply unit can include a power supply circuit that aids in powering the components of the computing system. The power supply circuit includes a power converter for converting DC voltages, and a clamping circuit that prevents the power converter from being inadvertently activated after being deactivated.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 1:
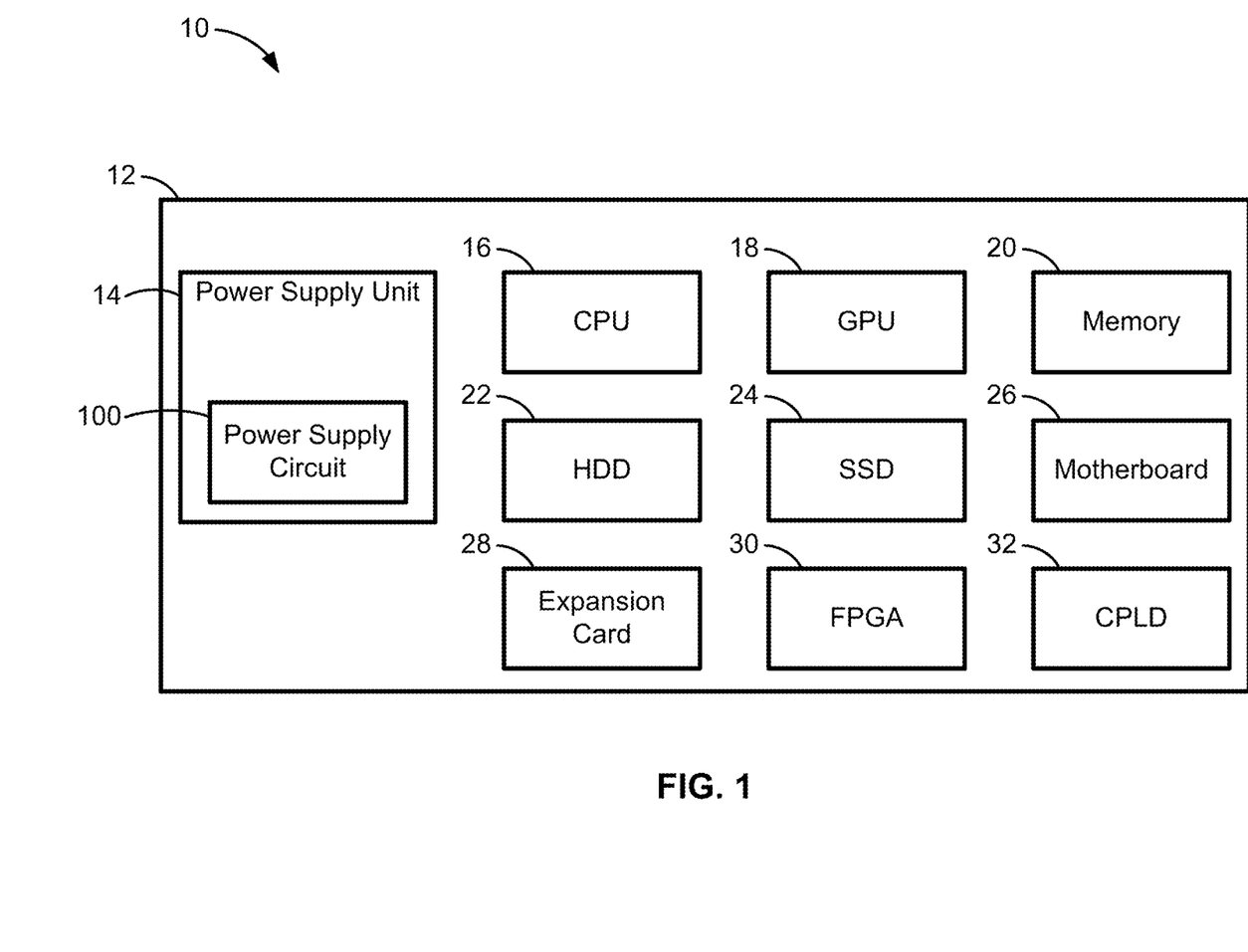
FIG. 1 is a block diagram of a computing system, according to aspects of the present disclosure.

FIG. 1 is a block diagram of an exemplary computing system 10, which can be a server. The computing system 10 includes a housing 12 that houses a power supply unit 14 and a variety of internal electronic components that aid in performing different functions and tasks. The electronic components can include a central processing unit (CPU) 16, a graphics processing unit (GPU) 18, one or more memory devices 20, one or more hard disk drives (HDDs) 22, one or more solid state drives (SSDs) 24, a motherboard 26, one or more expansion cards 28, a field-programmable gate array (FPGA) 30, and a complex programmable logic device (CPLD) 32. The power supply unit 14 can include an internal power supply circuit 100 that is configured to generate a voltage usable by any of the electronic components of the computing system 10, and to protect the electronic components from an undervoltage condition. The power supply unit 14 can also include other components. For example, the power supply unit 14 may include components to converter mains AC voltage into DC voltage. The power supply circuit 100 can then be used as a DC-to-DC converter.

Figure 2:
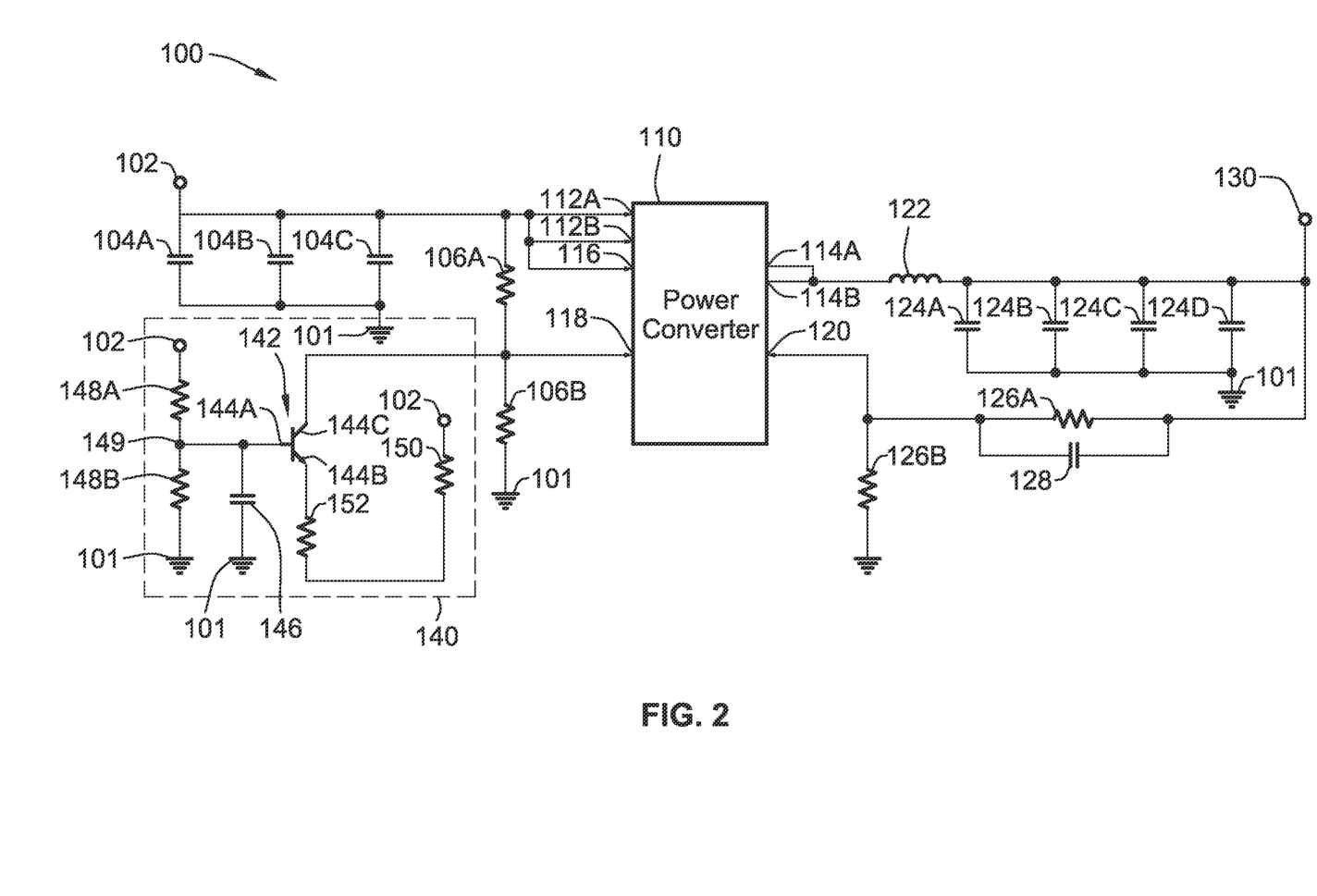
FIG. 2 is a circuit diagram of a power supply circuit for powering one or more components of the computing system of FIG. 1, according to certain aspects of the present disclosure.

FIG. 2 shows the power supply circuit 100 of the power supply unit 14. In some implementations, the power supply circuit 100 can operate as a switched-mode power supply. The power supply circuit 100 includes an input voltage source 102, a power converter 110, an output node 130, and a clamping circuit 140. In the illustrated implementation, the power converter 110 is an integrated circuit (IC) having a number of input and output pins. The power converter 110 includes input pins 112A and 112B, output pins 114A and 114B, an IC power supply pin 116, an enable pin 118, and a voltage feedback pin 120. The input voltage source 102 provides an input voltage, and is electrically connected to the input pins 112A and 112B, the IC power supply pin 116, and a group of input capacitors 104A, 104B, and 104C. The input capacitors 104A, 104B, and 104C are electrically connected in parallel with each other. A first end of each of the input capacitors 104A, 104B, and 104C is electrically connected to the input voltage source 102. A second end of each of the input capacitors 104A, 104B, and 104C is electrically connected to a ground 101. The input capacitors 104A, 104B, and 104C are used to smooth out spikes in the input voltage provided by the input voltage source 102.

The input voltage source 102 is electrically connected to the enable pin 118 through a resistor 106A and a resistor 106B. The input voltage source 102 is electrically connected to a first end of the resistor 106A. A second end of the resistor 106A is electrically connected to a first end of the resistor 106B, and the enable pin 118. A second end of the resistor 106B is electrically connected to the ground 101. The input voltage source 102, the resistor 106A, and the resistor 106B act as a voltage divider. The voltage provided to the enable pin 118 is equal to the voltage drop across the resistor 106B, and is generally less than the input voltage provided by the input voltage source 102, due to a voltage drop across at least the resistor 106A.

The clamping circuit 140 includes a bipolar junction transistor 142 with a base 144A, an emitter 144B, and a collector 144C. In some implementations, the transistor 142 is an NPN bipolar junction transistor. In other implementations, the transistor 142 is a PNP bipolar junction transistor. The clamping circuit 140 also includes a capacitor 146, and a voltage divider formed by the resistors 148A and 148B. The first ends of the resistors 148A and 148B are electrically connected to each other to form a voltage divider with a voltage divider output 149. The voltage divider output 149 is electrically connected to a first end the capacitor 146, as well as the base 144A of the transistor 142. A second end of capacitor 146 is electrically connected to the ground 101. A second end of the resistor 148A is electrically connected to the input voltage source 102. A second end of the resistor 148B is electrically connected to the ground 101. The clamping circuit further includes an emitter-side resistor 150 that is electrically connected between the emitter 144B of the transistor 142, and the input voltage source 102. In some implementations, a resistor 152 that has a resistance of about zero ohms (sometimes referred to as a zero-ohm link) can be electrically connected between the emitter 144B and the emitter-side resistor 150. In some implementations, the resistor 152 can have a resistance that is between 0 ohms and about 50 milliohms. The collector 144C of the transistor is electrically connected to the resistor 106A, the resistor 106B, and the enable pin 118 of the power converter 110.

The power converter 110 is configured to produce an output voltage at the output node 130 that can be used to power the electronic component. The power converter 110 includes output pins 114A and 114B that follow the voltage of the inputs pins 112A and 112B. Thus, the voltage provided at the output pins 114A and 114B is the same as the input voltage provided to the input pins 112A and 112B by the input voltage source 102. The power supply circuit 100 further includes an output inductor 122 and a group of output capacitors 124A, 124B, 124C, and 124D that act as a low-pass filter to filter out any ripple and noise in the output voltage provided at the output pins 114A and 114B. The output inductor 122 is electrically connected in series with the output pins 114A and 114B. The output capacitors 124A-124D are electrically connected to each other in parallel. A first end of each of the output capacitors 124A-124D is electrically connected to the ground 101. A second end of each of the output capacitors 124A-124D is electrically connected to both the output inductor 122 and the output node 130.

The power supply circuit further includes feedback resistors 126A and 126B, and a feedback capacitor 128. The feedback resistor 126A and the feedback capacitor 128 are electrically connected in parallel with each other. The first ends of the feedback resistor 126A and the feedback capacitor 128 are electrically connected to the output inductor 122, each of the output capacitors 124A-124D, and the output node 130. The second ends of the feedback resistor 126A and the feedback capacitor 128 are electrically connected to the voltage feedback pin 120, as well as a first end of the feedback resistor 126B. A second end of the feedback resistor 126B is electrically connected to the ground 101. The voltage at the output node 130 will be determined by the resistances of the feedback resistors 126A and 126B, as well as the voltage at the voltage feedback pin 120. In some implementations, the voltage at the voltage feedback pin 120 is about 0.6 Volts, the resistance of the feedback resistor 126A is about 56 kΩs, and the resistance of the feedback resistor 126B is about 12.4 kΩs, and thus the voltage at the output node 130 is about 3.309 Volts.

In some circumstances, the input voltage provided by the input voltage source 102 may be lower than needed to power the electronic components, which is referred to as an undervoltage condition. An undervoltage condition can occur during a power-up or power-down sequence of the power supply circuit 100. An undervoltage condition can also occur during normal operation of the power supply circuit 100. The enable pin 118 acts as an on-off switch for the power converter 110, and can be used to protect the electronic components during an undervoltage condition. If the power supply circuit 100 continues to function normally as the input voltage decreases, the voltage provided to the electronic components at the output node 130 would also decrease. If the voltage provided to the electronic components decreases to less than an undervoltage threshold, the electronic components can be damaged.

The enable pin 118 can prevent the undervoltage condition from occurring as the power supply circuit 100 is initially turned on, by activating the power converter 110 only when the input voltage provided by the input voltage source 102 is large enough to properly power the electronic components. The enable pin 118 also deactivates the power converter 110 as the power supply circuit 100 is turned off and the input voltage provided by the input voltage source 102 decreases.

In the power supply circuit 100, the voltage provided to the enable pin 118 is based on the input voltage provided by the input voltage source 102. When the input voltage is greater than or equal to a threshold input voltage, the voltage provided to the enable pin 118 is greater than or equal to a threshold enable voltage, such that the power converter 110 is activated. When activated, the power converter 110 converts the input voltage provided by the input voltage source 102 to an output voltage that is provided at the output pins 114A and 114B. When the input voltage decreases to less than the threshold input voltage, the voltage provided to the enable pin 118 decreases to less than the threshold enable voltage. The power converter 110 is deactivated, such that no output voltage is provided at the output pins 114A and 114B. The enable pin 118 can thus be used to protect the electronic components being powered by the power supply circuit 100, in the event that the input voltage provided by the input voltage source 102 begins to decrease.

Figure 3:
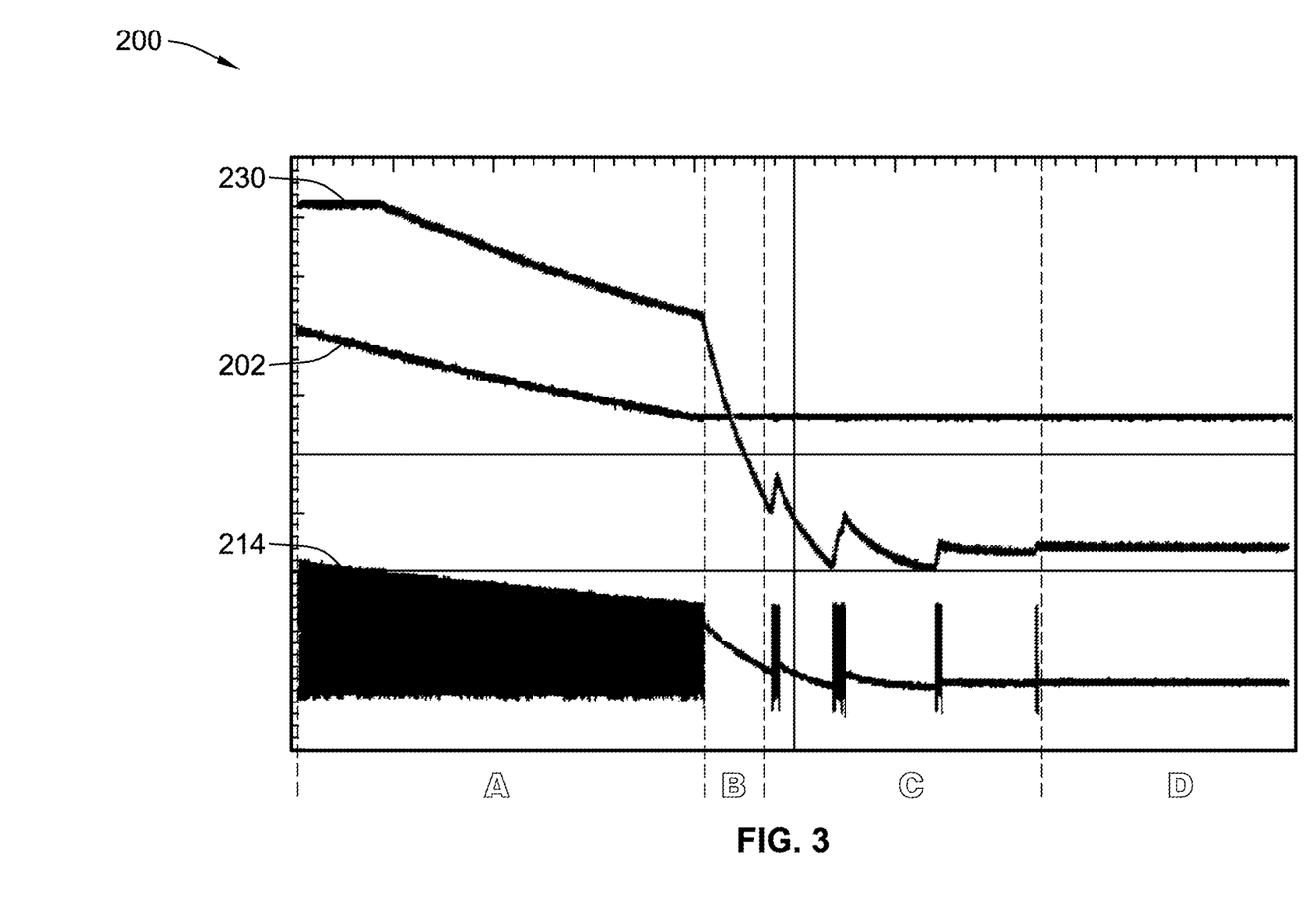
FIG. 3 is a voltage vs. time diagram showing a power-off sequence of the power supply circuit of FIG. 2 in the absence of a clamping circuit, according to aspects of the present disclosure.

FIG. 3 shows a voltage vs. time diagram 200 of the power supply circuit 100 of FIG. 2, if the voltage provided to the enable pin 118 (FIG. 2) is determined solely by the input voltage provided by the input voltage source 102 (FIG. 2). The diagram 200 shows an input voltage 202 provided by the input voltage source 102, an output voltage 214 provided at the output pins 114A and 114B (FIG. 2), and an output node voltage 230 provided at the output node 130 (FIG. 2), during a power-off sequence.

In region A of the diagram 200, the input voltage 202 gradually begins to decrease, which in turn causes both the output voltage 214 (at the output pins 114A and 114B) and the output node voltage 230 (at the output node 130) to gradually decrease. However, the input voltage 202 is sufficiently high such that the voltage provided to the enable pin 118 (FIG. 2) remains greater than or equal to the threshold enable voltage. The power converter 110 (FIG. 2) thus remains activated. Because the power supply circuit 100 operates as a switched-mode power supply, the output voltage 214 provided at the output pins 114A and 114B continually increases and decreases, resulting in the block-like shape of the output signal in region A of the diagram 200.

In region B of the diagram 200, the input voltage 202 has decreased a sufficient amount such that the voltage provided to the enable pin 118 is less than the threshold enable voltage, and the power converter 110 is deactivated. When the power converter 110 is deactivated, both the output voltage 214 (at the output pins 114A and 114B) and the output node voltage 230 (at the output node 130) begin to decrease more sharply as compared to region A of the diagram 200.

However, as shown in region C of the diagram 200, both the output voltage 214 (at the output pins 114A and 114B) and the output node voltage 230 (at the output node 130) can periodically spike upwards after the power converter 110 is deactivated. These spikes are caused by the input voltage 202 having a small ripple component. When alternating current (AC) voltages are converted to direct current (DC) voltages (using techniques such as rectification), the resulting voltage often includes both a DC component (e.g., a constant voltage) and a ripple component (e.g., a varying voltage) overlaid on the DC component. The resulting voltage will thus generally have a periodic variation with a series of repeated voltage spikes. The ripple component of the input voltage 202 can cause the input voltage 202 to periodically vary according to a ripple frequency (e.g., the frequency at which the voltage spikes in the input voltage 202 occur) and a ripple period (e.g., the time between adjacent voltage spikes in the input voltage 202). In some implementations, the ripple frequency is about 100 kHz, and thus the ripple period is about 10 μs. In other implementations, the ripple period is greater than about 0 μs and less than or equal to about 10 and thus the ripple frequency is generally greater than or equal to about 100 kHz.

When the input voltage 202 initially decreases and causes the voltage provided to the enable pin 118 to decrease below the threshold enable voltage, the power converter 110 is deactivated. However, the ripple component of the input voltage 202 can cause the input voltage 202 to continually vary, which in turn causes the voltage provided to the enable pin 118 to continually vary around the threshold enable voltage. The power converter 110 will be continually activated and deactivated, which results in the spikes in the output voltage 214 and the output node voltage 230 shown in region C of the diagram 200. This activation and deactivation can repeatedly occur until the DC component of the input voltage 202 decreases to such a degree that the voltage provided to the enable pin 118 remains below the threshold enable voltage despite any variation in the input voltage 202 due to the ripple component.

Finally, in region D of the diagram 200, the DC component of the input voltage 202 has decreased enough such that the voltage provided to the enable pin 118 remains below the threshold enable voltage, even when the ripple component causes the input voltage 202 to increase. The output voltage 214 (provided at the output pins 114A and 114B) and the output node voltage 230 (provided at the output node 130) will thus remain zero, even in the presence of the ripple component of the input voltage 202.

Referring back to FIG. 2, the clamping circuit 140 aids in preventing the temporary voltage spikes caused by the ripple component of the input voltage. When the input voltage provided by the input voltage source 102 increases to at least the threshold input voltage, the clamping circuit 140 activates the power converter 110, such that the output voltage is provided at the output pins 114A and 114B of the power converter 110. In response to the input voltage decreasing below the threshold input voltage, the clamping circuit 140 deactivates the power converter 110, and also prevents the power converter 110 from being re-activated within a predefined time period. Generally, the ripple period of the input voltage is less than the predefined time period. Even if the input voltage temporarily increases to at least the threshold input voltage due to the ripple component, the input voltage will subsequently decrease below the threshold input voltage within the predefined time period, and the power converter 110 will not be activated. The clamping circuit 140 thus prevents voltage spikes in the voltages at the output pins 114A and 114B, or the output node 130. In some implementations, the predefined time period is thus greater than or equal to the amount of time it takes for the ripple component of the input voltage to cause the input voltage to increase above the threshold input voltage and then decrease back below the threshold input voltage.

The transistor 142 of the clamping circuit 140 is configured to transition between an "on" state and an "off" state to activate and deactivate the power converter 110. When the input voltage provided by the input voltage source 102 is greater than or equal to the threshold input voltage, the voltage provided to the base 144A of the transistor 142 by the voltage divider output 149 is greater than or equal to a turn-on voltage of the transistor 142. The transistor 142 is thus in the "on" state, and current is able to flow between the collector 144C and the emitter 144B. The resistor 106A and the emitter-side resistor 150 are electrically connected in parallel with each other, between the input voltage source 102 and the resistor 106B. An on-state voltage divider is thus formed from the resistor 106A, the resistor 106B, and the emitter-side resistor 150. The on-state voltage divider has a voltage divider output 107 formed between (i) the resistor 106A and the emitter-side resistor 150, and (ii) the resistor 106B. The voltage divider output 107 is electrically connected to the enable pin 118 of the power converter 110.

When the input voltage provided by the input voltage source 102 is less than the threshold input voltage, the voltage provided to the base 144A of the transistor 142 by the voltage divider output 149 is less than a turn-on voltage of the transistor 142. The transistor 142 is thus in the "off" state, and current is unable to flow between the collector 144C and the emitter 144B. The emitter-side resistor 150 is disconnected from the resistor 106A and the resistor 106B, such that only the resistor 106A is electrically connected between the input voltage source 102 and the resistor 106B. An off-state voltage divider is thus formed from the resistor 106A and the resistor 106B. The voltage divider output 107 is still formed between the resistor 106A and the resistor 106B, and is electrically connected to the enable pin 118 of the power converter 110. The off-state voltage divider thus does not include the emitter-side resistor 150, and the enable pin 118 is electrically connected to the input voltage source 102 through only the resistor 106A.

Thus, the resistance values of the resistor 106A, the resistor 106B, the resistor 148A, the resistor 148B, and the emitter-side resistor 150 are chosen so that when the input voltage is less than the threshold input voltage, the voltage provided to the transistor 142 is less than the turn-on voltage of the transistor 142, and the voltage provided to the enable pin 118 of the power converter 110 is less than the threshold enable voltage. When the voltage provided to the enable pin 118 of the power converter 110 is less than the threshold enable voltage, the power converter 110 is deactivated.

The resistance values of the resistor 106A, the resistor 106B, the resistor 148A, the resistor 148B, and the emitter-side resistor 150 are also chosen so that when the input voltage is greater than or equal to the threshold input voltage, the voltage provided to the transistor 142 is greater than or equal to the turn-on voltage of the transistor 142, and the voltage provided to the enable pin 118 of the power converter 110 is greater than or equal to the threshold enable voltage. When the voltage provided to the enable pin 118 of the power converter 110 is greater than or equal to the threshold enable voltage, the power converter is activated.

In some implementations, the resistance of the resistor 106A is about 200 k$\Omega$. In some implementations, the resistance of the resistor 106B is about 120 k$\Omega$. In some implementations, the resistance of the resistor 148AA is about 205 k$\Omega$. In some implementations, the resistance of the resistor 148B is about 205 k$\Omega$. In some implementations, the resistance of the emitter-side resistor 150 is about 10 k$\Omega$.

When the input voltage provided by the input voltage source 102 initially increases to at least the threshold input voltage during a power-up sequence, the voltage provided to the base 144A of the transistor 142 is greater than or equal to the turn-on voltage of the transistor 142, and the transistor 142 transitions from the "off" state to the "on" state. Because the transistor 142 is in the "on" state, the voltage provided to the enable pin 118 by the voltage divider output 107 is determined by the resistance values of the resistor 106A, the resistor 106B, and the emitter-side resistor 150 (e.g., the on-state voltage divider).

When the resistor 106A and the emitter-side resistor 150 are electrically connected in parallel, the combined resistance of the resistor 106A and the emitter-side resistor 150 is less than the resistance of only the resistor 106A. For example, in some implementations the resistance of the resistor 106A is about 200 k$\Omega$ and the resistance of the emitter-side resistor 150 is about 10 k$\Omega$. The resistor 106A and the emitter-side resistor 150 have a combined resistance of about 9.5 k$\Omega$ because they are electrically connected in parallel.

The voltage drop across the combined resistance of the resistor 106A and the emitter-side resistor 150 in the on-state voltage divider is thus smaller than the voltage drop across only the resistor 106A in the off-state voltage divider. In turn, the voltage drop across the resistor 106B is larger in the on-state voltage divider than it is in the off-state voltage divider. Thus, the voltage provided to the enable pin 118 by the on-state voltage divider is larger than the voltage provided to the enable pin 118 by the off-state voltage divider. The voltage provided to the enable pin 118 by the on-state voltage divider is greater than or equal to the threshold enable voltage, and thus the power converter 110 is activated when the on-state voltage divider is formed. In some implementations, the threshold enable voltage is less than the threshold input voltage.

When the transistor 142 is in the "on" state and the input voltage decreases below the threshold input voltage during a power-down sequence, the transistor 142 transitions back to the "off" state. In the "off" state, current is again unable to flow between the collector 144C and the emitter 144B, such that the emitter-side resistor 150 is not electrically connected in parallel with the resistor 106A. The resistance of the resistor 106A is larger than the combined resistance of the resistor 106A and the emitter-side resistor 150. The voltage drop across the resistor 106A is thus larger than the voltage drop across the combined resistance of the resistor 106A and the emitter-side resistor 150.

In turn, the voltage drop across the resistor 106B is smaller in the off-state voltage divider than it is in the on-state voltage divider, and the voltage provided to the enable pin 118 by the off-state voltage divider is smaller than the voltage provided to the enable pin 118 by the on-state voltage divider. The voltage provided to the enable pin 118 by the off-state voltage divider is less than the threshold enable voltage, which deactivates the power converter 110.

The transistor 142 has a switching frequency that defines how quickly the transistor 142 can transition from the "off" state to the "on" state, and/or from the "on" state to the "off" state. For example, if the transistor 142 is capable of making only one transition per second between the "on" state and the "off" state, the switching frequency of the transistor 142 is 1 Hertz. The switching frequency of the transistor 142 is less than the ripple frequency of the ripple component of the input voltage. Thus, the time it takes for the transistor 142 to transition between states (the switching period) is greater than the time that the input voltage will be temporarily increased due to the ripple component (the ripple period) of the input voltage. In some implementations, the switching period is greater than or equal to about 1 millisecond, and the switching frequency is less than or equal to 1 kHz.

Once the input voltage has fallen below the input voltage threshold during the power-down sequence and the transistor 142 has transitioned to the "off" state, the switching frequency of the transistor 142 prevents the ripple component of the input voltage from temporarily transitioning the transistor 142 back to the "on" state and activating the power converter 110. If the ripple component causes the input voltage to increase to at least the threshold input voltage, the input voltage will remain at the threshold voltage (or above) for a period of time equal to the ripple period. The input voltage will then decrease back below the threshold input voltage at the end of the ripple period. During the time that the input voltage is momentarily greater than or equal to the threshold input voltage, the voltage applied to the base 144A of the transistor 142 is greater than or equal to the turn-on voltage of the transistor 142. However, because the switching frequency is less than the ripple frequency (and the switching period is greater than the ripple period), the transistor 142 cannot transition from the "off" state to the "on" state before the input voltage decreases back below the threshold input voltage. As such, once the transistor 142 transitions from the "on" state to the "off" state, the transistor 142 remains in the "off" state when the input voltage momentary increases due to the ripple component, because the transistor 142 cannot momentarily transition back to the "on" state quick enough. The clamping circuit 140 thus prevents the output voltage (at the output pins 114A and 114B) and the output node voltage (at the output node 130) from experiencing the voltage spikes (shown in FIG. 3) that can otherwise be caused by the ripple component of the input voltage.

Figure 4:
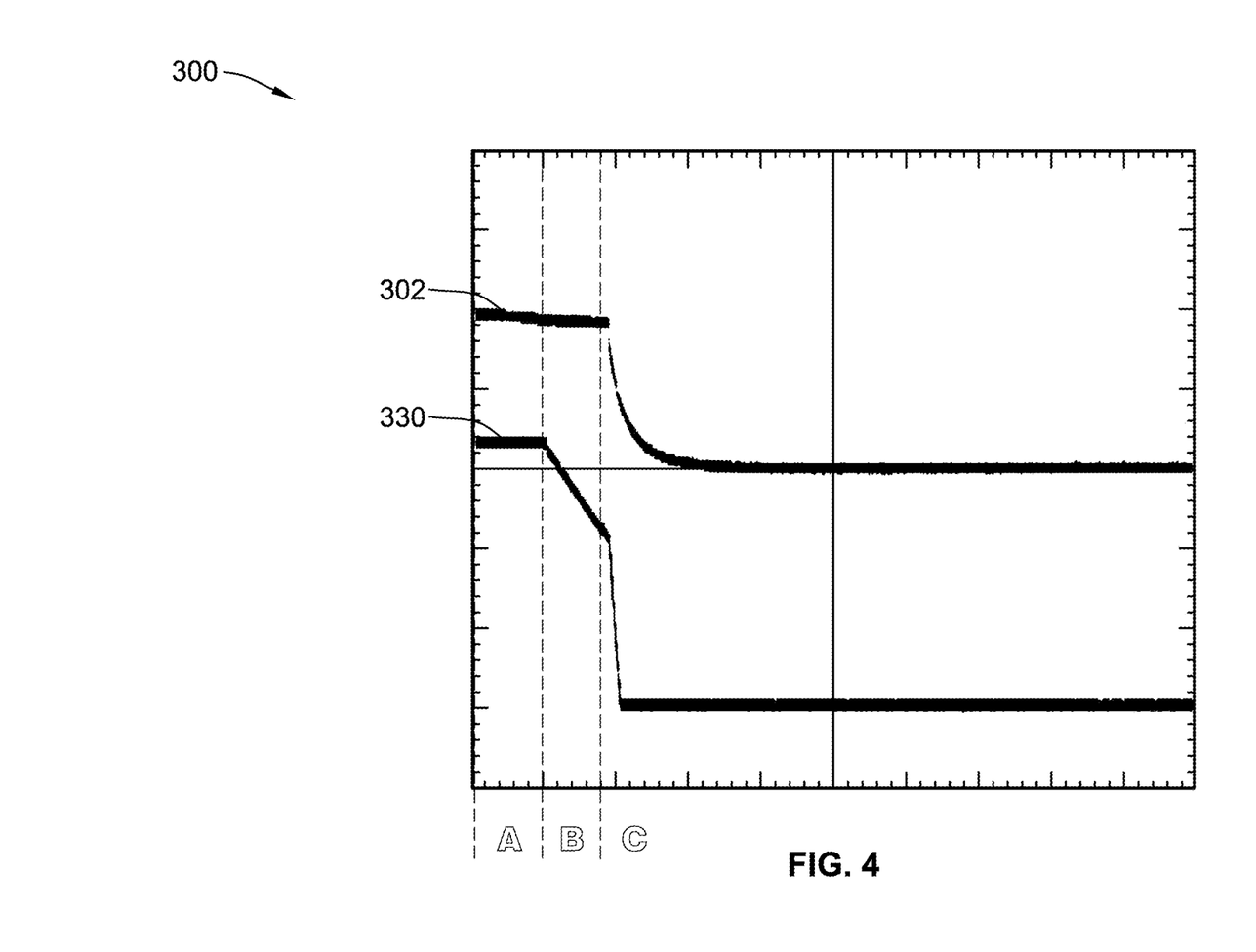
FIG. 4 is a voltage vs. time diagram showing a power-off sequence of the power supply circuit of FIG. 2 in the presence of a clamping circuit, according to aspects of the present disclosure.

FIG. 4 shows a voltage vs. time diagram 300 of the power supply circuit 100 of FIG. 2, illustrating the effect of the clamping circuit 140. The diagram 300 shows an input voltage 302 provided by the input voltage source 102 and an output node voltage 330 provided at the output node 130 (FIG. 2), during the power-off sequence. In region A of the diagram 300, the input voltage 302 is generally constant, and the output node voltage 330 is correspondingly generally constant. In region B of the diagram 300, the input voltage 302 begins to gradually decrease, but is still greater than the threshold input voltage. The output node voltage 330 also begins to decrease in response to the decreasing input voltage 302. However, because the input voltage 302 is still greater than the threshold input voltage, the transistor 142 (FIG. 2) remains in the "on" state, such that the power converter 110 remains activated and producing the output node voltage 330. In region C of the diagram 300, the input voltage 302 more quickly decreases to zero. Because the input voltage 302 falls below the threshold input voltage, the transistor 142 transitions to the "off" state and the power converter 110 is deactivated. The output node voltage 330 thus also decreases to zero. Due to the presence of the clamping circuit 140, the output node voltage 330 does not experience any temporary voltage spikes due to the ripple component of the input voltage 302.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:
1. A power supply circuit comprising:
a power converter having an input pin, an output pin, and an enable pin;
an input voltage source electrically connected to the input pin of the power converter, the input voltage source being configured to provide an input voltage, the input voltage including a ripple component that causes the input voltage to have a periodic variation with a ripple frequency and a ripple period; and
a clamping circuit electrically connected to the enable pin of the power converter, the clamping circuit including a transistor electrically connected to the input voltage source and the enable pin of the power converter, the transistor being configured to transition between an "on" state and an "off" state to activate and deactivate the power converter, wherein:
in response to the input voltage increasing to at least a threshold input voltage, the transistor transitions from the "off" state to the "on" state and causes a threshold enable voltage to be provided to the enable pin of the power converter, such that the clamping circuit activates the power converter to provide an output voltage at the output pin, and in response to the input voltage decreasing below the threshold input voltage, the clamping circuit deactivates the power converter and prevents the power converter from being re-activated within a predefined time period.

2. The power supply circuit of claim 1, wherein in response to the input voltage initially decreasing below the threshold input voltage and then increasing to at least the threshold input voltage due to the ripple component, the clamping circuit prevents the power converter from being re-activated.

3. The power supply circuit of claim 2, wherein the ripple period is less than the predefined time period, such that the ripple component causes the input voltage to increase to at least the threshold input voltage and to subsequently decrease below the threshold input voltage within the predefined time period.

4. The power supply circuit of claim 1, wherein the threshold enable voltage is less than the threshold input voltage.

5. The power supply circuit of claim 1, wherein in response to the input voltage decreasing below the threshold input voltage, the transistor transitions from the "on" state to the "off" state, such that a voltage provided to the enable pin of the power converter is less than the threshold enable voltage.

6. A power supply circuit comprising:
a power converter having an input pin, an output pin, and an enable pin;
an input voltage source configured to provide an input voltage to the input pin of the power converter;
a first resistor electrically connected to the input voltage source and the enable pin of the power converter, such that the input voltage source is electrically connected to the enable pin of the power converter through at least the first resistor;
a second resistor electrically connected to the first resistor and the enable pin of the power converter; and
a clamping circuit electrically connected to the enable pin of the power converter, the clamping circuit including:
a transistor having a base, an emitter, and a collector, the base being electrically connected to the input voltage source, the collector being electrically connected to the enable pin of the power converter; and
an emitter-side resistor electrically connected between the emitter and the input voltage source, wherein:
in response to the input voltage increasing to at least a threshold input voltage, an on-state voltage divider is formed with the first resistor, the second resistor, and the emitter-side resistor to activate the power converter and provide an output voltage at the output pin; and
in response to the input voltage decreasing below the threshold input voltage, an off-state voltage divider is formed with the first resistor and the second resistor to deactivate the power converter, and the power converter is prevented from being re-activated within a predefined time period.

7. A power supply circuit comprising:
a power converter having an input pin, an output pin, and an enable pin;
an input voltage source electrically connected to the input pin of the power converter, the input voltage source being configured to provide an input voltage, the input voltage including a ripple component that causes the input voltage to have a periodic variation with a ripple frequency and a ripple period; and
a clamping circuit electrically connected to the enable pin of the power converter, the clamping circuit including a transistor electrically connected to the input voltage source and the enable pin of the power converter, the transistor being configured to transition between an "on" state and an "off" state to activate and deactivate the power converter, the transistor having a switching frequency that defines a time required for the transistor to transition between the "on" state and the "off" state, the switching frequency being less than the ripple frequency of the ripple component of the input voltage, wherein:
in response to the input voltage increasing to at least a threshold input voltage, the clamping circuit activates the power converter to provide an output voltage at the output pin, and
in response to the input voltage decreasing below the threshold input voltage, the clamping circuit deactivates the power converter and prevents the power converter from being re-activated within a predefined time period.

8. The power supply circuit of claim 7, wherein:
in response to the input voltage initially increasing to at least the threshold input voltage, the transistor transitions to the "on" state to activate the power converter; and
in response to the input voltage subsequently decreasing below the threshold input voltage, the transistor transitions to the "off" state to deactivate the power converter.

9. The power supply circuit of claim 8, wherein in response to the ripple component of the input voltage causing the input voltage to, within the predefined time period, (i) increase to at least the threshold input voltage and then (ii) decrease below the input voltage, the transistor remains in the "off" state.

10. The power supply circuit of claim 9, wherein the ripple component of the input voltage causes the input voltage to increase to at least the threshold input voltage and then decrease below the threshold input voltage within the ripple period, the ripple period being less than the predefined time period.

11. The power supply circuit of claim 10, wherein the transistor is able to transition to the "on" state only after the predefined time period has passed since the transistor transitioned to the "off" state, such that in response to the ripple component of the input voltage causing the input voltage to increase to at least the threshold input voltage, the transistor does not transition to the "on" state before the ripple component of the input voltage causes the input voltage to decrease below the threshold input voltage.

12. A power supply circuit comprising:
a power converter having an input pin, an output pin, and an enable pin;
an input voltage source electrically connected to the input pin of the power converter, the input voltage source being configured to provide an input voltage, the input voltage including a ripple component that causes the input voltage to have a periodic variation with a ripple frequency and a ripple period; and
a clamping circuit electrically connected to the enable pin of the power converter, the clamping circuit including a transistor electrically connected to the input voltage source and the enable pin of the power converter, the transistor including a base, an emitter, and a collector, the base being electrically connected to the input voltage source, the emitter being electrically connected to the input voltage source through an emitter-side resistor, and the collector being electrically connected to the enable pin of the power converter, the transistor being configured to transition between an "on" state and an "off" state to activate and deactivate the power converter, wherein:

in response to the input voltage increasing to at least a threshold input voltage, the clamping circuit activates the power converter to provide an output voltage at the output pin, and in response to the input voltage decreasing below the threshold input voltage, the clamping circuit deactivates the power converter and prevents the power converter from being re-activated within a pre-defined time period.

13. The power supply circuit of claim 12, wherein when the input voltage is greater than or equal to the threshold input voltage, a voltage provided to the base of the transistor is greater than or equal to a turn-on voltage of the transistor, such that an on-state voltage divider is formed with the emitter-side resistor, the on-state voltage divider providing a voltage to the enable pin of the power converter that is greater than or equal to a threshold enable voltage.

14. The power supply circuit of claim 13, wherein when the input voltage source is less than the threshold input voltage, the voltage provided to the base of the transistor is less than the turn-on voltage of the transistor, such that an off-state voltage divider is formed that excludes the emitter-side resistor, the off-state voltage divider providing a voltage to the enable pin of the power converter that is less than the threshold enable voltage.

15. The power supply circuit of claim 14, wherein:

the on-state voltage divider includes the emitter-side resistor and an additional resistor electrically connected in parallel between the input voltage source and the enable pin; and the off-state voltage divider includes only the additional resistor electrically connected between the input voltage source and the enable pin.

* * * * *